United States Patent
Yanai et al.

(10) Patent No.: US 11,502,829 B2
(45) Date of Patent: Nov. 15, 2022

(54) ROBUST INPUT VERIFICATION FOR SECURE MULTI-PARTY COMPUTATION (MPC) WITH CLIENTS

(71) Applicant: VMware, Inc., Palo Alto, CA (US)

(72) Inventors: Avishay Yanai, Herzliya (IL); Ittai Abraham, Tel Aviv (IL)

(73) Assignee: VMWARE, INC., Palo Alto, CA (US)

( * ) Notice: Subject to any disclaimer, the term of this patent is extended or adjusted under 35 U.S.C. 154(b) by 7 days.

(21) Appl. No.: 17/010,526

(22) Filed: Sep. 2, 2020

(65) Prior Publication Data

US 2022/0069979 A1 Mar. 3, 2022

(51) Int. Cl.
*H04L 9/08* (2006.01)
*H04L 9/32* (2006.01)
*H04L 9/00* (2022.01)

(52) U.S. Cl.
CPC .............. *H04L 9/085* (2013.01); *H04L 9/008* (2013.01); *H04L 9/3218* (2013.01); *H04L 2209/46* (2013.01)

(58) Field of Classification Search
CPC ....... H04L 9/085; H04L 9/008; H04L 9/3218; H04L 2209/46
See application file for complete search history.

(56) References Cited

U.S. PATENT DOCUMENTS

| | | | |
|---|---|---|---|
| 9,536,114 B1* | 1/2017 | El Defrawy | H04L 63/04 |
| 9,614,676 B1* | 4/2017 | El Defrawy | H04L 9/085 |
| 10,216,537 B2* | 2/2019 | Twitchell, Jr. | G06F 3/0604 |
| 11,159,323 B1* | 10/2021 | Barraza Enciso | G06F 21/6245 |
| 2017/0124562 A1* | 5/2017 | Hessler | G06Q 20/386 |
| 2017/0353855 A1* | 12/2017 | Joy | H04W 12/02 |
| 2019/0228299 A1* | 7/2019 | Chandran | G06N 3/0454 |
| 2020/0153640 A1* | 5/2020 | Ranellucci | H04L 9/088 |
| 2020/0320206 A1* | 10/2020 | Cammarota | G06F 21/57 |
| 2020/0374113 A1* | 11/2020 | Noam | G06F 21/64 |
| 2021/0319098 A1* | 10/2021 | Pogorelik | G06N 3/04 |
| 2021/0328798 A1* | 10/2021 | Liu | H04L 9/3247 |

* cited by examiner

*Primary Examiner* — Ashokkumar B Patel
*Assistant Examiner* — William B Jones (57) ABSTRACT

In one set of embodiments, each server executing a secure multi-party computation (MPC) protocol can receive shares of inputs to the MPC protocol from a plurality of clients, where each input is private to each client and where each share is generated from its corresponding input using a threshold secret sharing scheme. Each server can then verify whether the shares of the plurality of inputs are valid/invalid and, for each invalid share, determine whether a client that submitted the invalid share or a server that holds the invalid share is corrupted. If the client that submitted the invalid share is corrupted, each server can ignore the input of that corrupted client during a computation phase of the MPC protocol. Alternatively, if the server that holds the invalid share is corrupted, each server can prevent that corrupted server from participating in the computation phase.

21 Claims, 4 Drawing Sheets

ROBUST INPUT VERIFICATION FOR SECURE MULTI-PARTY COMPUTATION (MPC) WITH CLIENTS

BACKGROUND

Secure multi-party computation (MPC) is a cryptographic technology that enables two or more parties to jointly compute a function over a set of inputs while keeping the inputs private. For example, consider a simple scenario in which three parties A, B, and C have respective private inputs x, y, and z and would like to obtain the sum of these inputs without revealing x, y, and z to each other. In an ideal world, A, B, and C could each submit their input to an incorruptible and perfectly trustworthy third party $\mathcal{T}$. $\mathcal{T}$ could then compute x+y+z on their behalf and output the resulting sum, thereby preventing A, B, and C from learning each other's inputs. In the real world, however, incorruptible and perfectly trustworthy third party $\mathcal{T}$ does not exist. MPC addresses this problem by providing protocols which allow A, B, and C to collectively evaluate, via a series of message exchanges, x+y+z in a manner that achieves the same input privacy as the ideal world model, without relying on $\mathcal{T}$.

A common approach for designing an MPC protocol involves having each party distribute cryptographic shares of its input to the other parties using a threshold secret sharing scheme such as Shamir's secret sharing. Through this process, each party receives partial information regarding the other parties' inputs, which is sufficient for the party to carry out the protocol's computation but is insufficient (at least in isolation) for the party to learn the inputs. In an MPC protocol executed by n parties, the sharing of an input x via a secret sharing scheme with threshold t is secure in the sense that up to t of the n parties may collude and disclose their shares to each other without learning anything regarding x. Such colluding parties are referred to as "corrupted" and it is assumed that all corrupted parties follow a single strategy dictated by a "semi-honest" or "malicious" adversary. If the adversary is semi-honest, the corrupted parties will correctly follow the MPC protocol specification and will only try to learn private information by collecting data arising out of normal protocol execution (e.g., the internal state of each corrupted party, the transcript of messages received, etc.). If the adversary is malicious, the corrupted parties may arbitrarily deviate from the protocol specification in order to learn private information. MPC protocols that can withstand attacks from semi-honest adversaries or malicious adversaries are said to "be semi-honest-secure"/ "have semi-honest security" or "be malicious-secure"/"have malicious security" respectively.

In recent years, a number of secret sharing-based MPC protocols with malicious security have been proposed that are close in computational and/or communication cost to semi-honest-secure MPC protocols. However, these proposed protocols suffer from at least two deficiencies. First, they are "secure with abort" (or in other words, are "non-robust"), which means that the adversary can cause the protocol to abort prior to completion, thereby preventing uncorrupted (i.e., honest) parties from obtaining the protocol's output. Second, the proposed protocols only allow parties that participate in protocol computation (referred to herein as "servers") to submit inputs. This limitation-which arises out of the protocols' inability to distinguish between corrupted clients and corrupted servers at the time of verifying input sharings—is problematic because many MPC applications (e.g., secure auctions, electronic voting, etc.) are designed to receive inputs from a large group of "clients" that do not take part in computation.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

The present disclosure is directed to techniques for implementing robust input verification in a secret sharing-based malicious-secure MPC protocol that is capable of receiving inputs from N clients (and is executed by n servers). As used herein, "input verification" refers to the task of verifying that the shares of an input provided by a client to the servers via a threshold secret sharing scheme are valid, which means that the shares conform to the secret sharing scheme's rules/restrictions.

The techniques of the present disclosure rely on two assumptions: first, at most t<n/4 servers are corrupted (and thus at least 3t+1 servers are honest), and second, at most $(1-\rho)N$ clients are corrupted for $0<\rho\le1$ (and thus at least $\rho N$ clients are honest). With these assumptions in place, the techniques ensure that (1) the adversary controlling the corrupted clients and corrupted servers cannot abort execution of the protocol, (2) a corrupted client cannot disqualify an honest server from participating in the protocol, and (3) a corrupted server cannot "censor" an honest client (i.e., prevent that client's input from being included in the protocol's computation). The foregoing and other aspects are explained in further detail in the sections that follow.

2. Operating Environment and High-Level Solution Description

Figure 1:
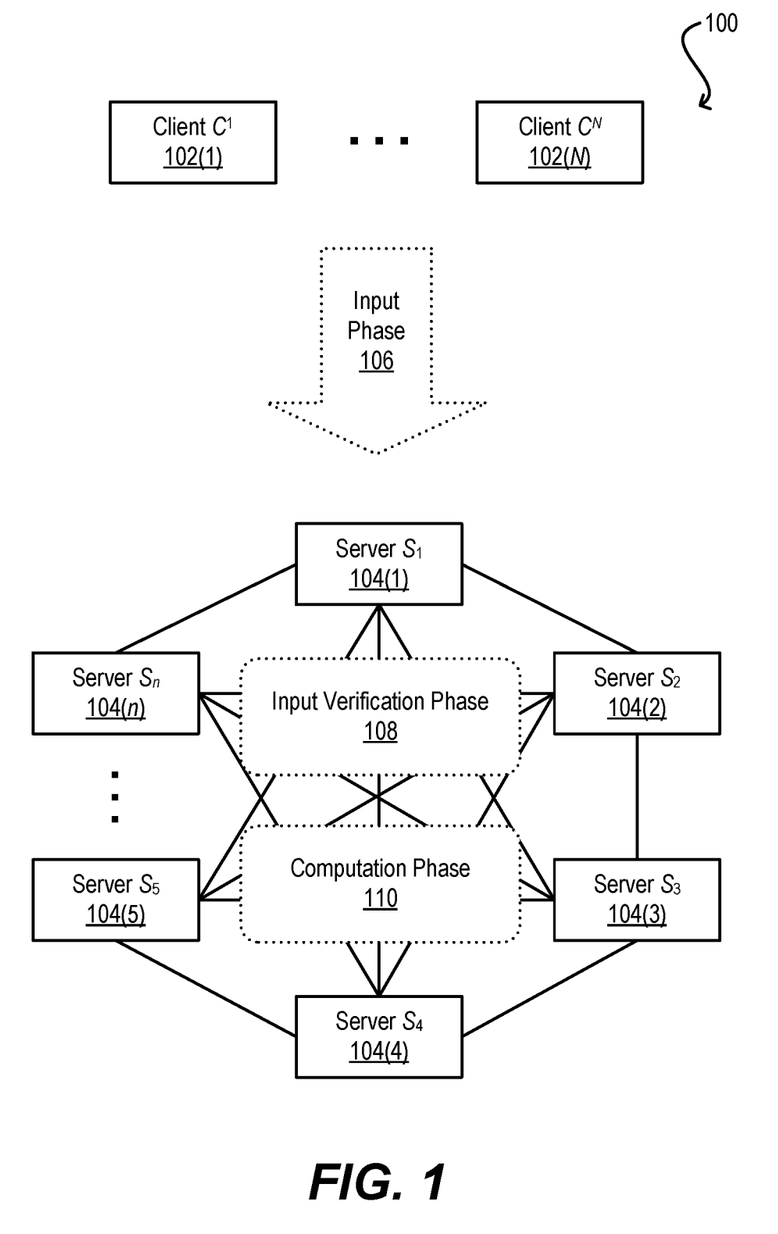
FIG. 1 depicts an example operating environment in which embodiments of the present disclosure may be implemented.

To provide context for the embodiments described herein, FIG. 1 depicts an operating environment 100 comprising N clients $C^1, \ldots, C^N$ (reference numerals 102(1)-(N)) and n servers $S_1, \ldots, S_n$ (reference numerals 104(1)-(n)) and a general framework that may be used by the clients and servers for executing a secret sharing-based malicious-secure MPC protocol. As shown, this framework comprises three main phases: an input phase 106, an input verification phase 108, and a computation phase 110.

During input phase 106, each client $C^k$ submits an input $x^k$ to servers $S_1, \ldots, S_n$ by sharing it using a threshold secret sharing scheme, which means client $C^k$ submits a cryptographic share $x^k_q$ of $x^k$ to each server $S_q$ for $q=1, \ldots, n$. If Shamir's secret sharing is used, input $x^k$ is an element of a finite field $\mathbb{F}$ and each share $x_q^k = f(q)$ where f is t-degree polynomial with $f(0)=x^k$ and where t is the maximum number of corrupted servers. It is well known that such a t-degree polynomial (or "t-polynomial") theoretically hides the secret encoded at f(0) from any subset of at most t shareholders. Vector $\vec{x^k}=(x_1^k, \ldots, x_n^k)$, which represents the shares of input $x^k$ provided to servers $S_1, \ldots, S_n$, is said to be "consistent with," or a "consistent sharing" of, $x^k$ if the shares of all honest servers agree with polynomial f (i.e., reside on the polynomial, such that $x_q^k=f(q)$ for every honest server $S_q$). By a corollary, there are at most t servers that disagree with the polynomial in this scenario. Further, vector $x^k$ is said to be a "perfectly consistent with," or a "perfectly consistent sharing" of, $x^k$ if the shares of all servers (even corrupted ones) agree with polynomial f. For the remainder of this disclosure, [x] is used to denote a consistent sharing of a given input/secret x.

Once all clients have provided their input shares, servers $S_1, \ldots, S_n$ verify (via input verification phase 108) that the shares of each input are valid in order to detect cheating by corrupted clients/servers. The servers perform this verification in a manner that does not reveal the shares to each other, thereby maintaining the privacy of inputs $x^1, \ldots, x^N$. There are several ways in which input verification phase 108 can be generally structured based on, e.g., the specific threshold secret sharing scheme used, degree of complexity tolerated, and so on. If Shamir's secret sharing is employed as mentioned above, one approach is for each server $S_q$ to obtain a share $r_q$ of a secret random value r where the sharing of r is guaranteed to be consistent. For example, shares $r_1, \ldots, r_n$ can be computed offline and seeded on respective servers $S_1, \ldots, S_n$ using a secure method. Each server $S_q$ can then (1) add $r_q$ to its share $x_q^k$ of a client input $x^k$ to generate $\alpha_q^k$, (2) broadcast as to every other server, and (3) upon receiving the other servers' $\alpha$ values, invoke a Reconstruct([$\alpha$]) procedure which attempts to interpolate a t-polynomial f such that $f(i)=\alpha_i^k$ for $i=1, \ldots, n$.

If the Reconstruct procedure is successful, that means $\vec{x^k}$ is a consistent sharing of input $x^k$ and the shares which agree with interpolated polynomial f are valid shares of $x^k$. Conversely, the shares which do not agree with f in this scenario are invalid shares of $x^k$ and are referred to as "bad points" (because they do not reside on the polynomial). In general, the Reconstruct procedure will succeed in interpolating f if there are at most $$\left\lfloor \frac{n-t}{2} \right\rfloor$$

disagreeing shares (or stated another way, if there are at most $$\left\lfloor \frac{n-t}{2} \right\rfloor$$

shares which do not reside on f).

Finally, during computation phase 110, servers $S_1, \ldots, S_n$ compute the function of the MPC protocol over the input shares verified during input verification phase 108 and obtain a protocol output. This specific nature of this computation, which is beyond the scope of this disclosure, will vary based on the characteristics of the function and the protocol implementation.

As noted the Background section, there are a number of secret sharing-based malicious-secure MPC protocols in the art that offer relatively high efficiency, but are non-robust (i.e., can be aborted by the adversary) and are incapable of receiving inputs from non-participant clients. A key reason for the latter limitation is that, when a client input is shared among servers and cheating (i.e., an invalid share) is detected during input verification phase 108, these existing protocols cannot easily determine whether the cheating was carried out by a corrupted client or a corrupted server, which raises significant problems. For example, if the cheating was performed by a corrupted client but it is erroneously blamed on an honest server, that server will be excluded from further participation in the protocol, which means that corrupted clients can arbitrarily disqualify honest servers. If such an attack is repeated n–t times then only corrupted servers will remain for carrying out computation phase 110, which is clearly no longer secure (as corrupted servers may collude and reveal their shares to each other). Conversely, if the cheating was performed by a corrupted server but it is erroneously blamed on an honest client, that client's input will be ignored during the computation phase, which means that corrupted servers can arbitrarily censor honest clients.

To address the foregoing limitations, embodiments of the present disclosure provide a novel input verification protocol—usable by servers $S_1, \ldots, S_n$ during input verification phase 108 of FIG. 1—that (1) is robust, (2) ensures corrupted clients cannot disqualify honest servers, and (3) ensures corrupted servers cannot censor honest clients. At a high level, properties (2) and (3) are achieved by assuming at most $(1-\rho)N$ clients are corrupted (and thus corrupted clients can "blame" honest servers, by dealing them invalid shares, at most $(1-\rho)N$ times). With this assumption, the novel input verification protocol can distinguish between corrupted clients and corrupted servers during input verification phase 108, thereby avoiding the incorrect disqualification of honest servers or the incorrect censoring of honest clients.

For example, as described in further detail below, the novel protocol can initialize a counter $ctr_q$ to 0 for each server $S_q$. The protocol can then increment this counter each time $S_q$ is found to hold an invalid share/bad point for a consistent input sharing (per, e.g., Shamir's Reconstruct procedure). If $ctr_q$ exceeds $(1-\rho)N$ at any juncture of input verification phase 108, the protocol can definitively conclude that $S_q$ is corrupted and can eliminate it from participating in computation phase 110. For input sharings that are found to be consistent but include some number of bad points held by servers with counters less than $(1-\rho)N$, the novel protocol can request that the clients which originated those sharings resubmit them via a stronger (and more expensive) method to definitively determine whether the clients or servers are corrupted.

With regard to property (1) above (i.e., robustness), this is achieved via a combination of properties (2) and (3) and the assumption that at most $t<n/4$ servers are corrupted. As mentioned previously, with Shamir's secret sharing, the Reconstruct procedure will succeed in interpolating a t-polynomial f for a sharing of a given input/secret x if there are at most $$\left\lfloor \frac{n-t}{2} \right\rfloor$$

disagreeing shares/servers. When $n \geq 4t+1$, this procedure succeeds if there are at most 1.5t bad points (i.e., invalid shares/disagreeing servers). Accordingly, the adversary cannot abort the protocol by, e.g., causing some combination of corrupted servers/clients to broadcast/submit invalid shares (or nothing at all) for a given input $x^k$ to the honest servers, because (A) if at least 3t+1 servers (i.e., the honest servers)

receive valid shares, Reconstruct[$\alpha^k$] will succeed (and the protocol can proceed to identify corrupted servers as above), and (B) if Reconstruct[$\alpha^k$] fails due to more than n/4 bad points, client $C^k$ can be definitely identified as corrupted. In either case, the protocol can move forward and thus avoid being halted.

Section (3) below presents a "non-batched" implementation of the novel input verification protocol in which verification is performed on a per-client basis (i.e., sequentially on each input sharing submitted by clients $C^1, \ldots, C^N$). And section (4) below presents a more efficient "batched" implementation of the novel input verification protocol that optimistically assumes all clients and servers are honest and thus attempts to verify the input sharings of all clients $C^1, \ldots, C^N$ together (i.e., as an aggregation). This is possible because, under Shamir's secret sharing, if two or more sharings are combined via a linear operator and those individual sharings are perfectly consistent, the combination is also guaranteed to be perfectly consistent. If the verification of the aggregated sharing of $C^1, \ldots, C^N$ succeeds (i.e., the aggregated sharing is perfectly consistent), servers $S_1, \ldots, S_n$ can immediately move on to computation phase 110. Alternatively if the verification of the aggregated sharing fails (i.e., the aggregated sharing comprises one or more invalid shares), the servers can perform a binary search to find the invalid shares (i.e., verify aggregations of the first and second halves of the shares), and this can continue recursively until the invalid shares are identified.

3. Non-Batched Robust Input Verification

Figure 2:
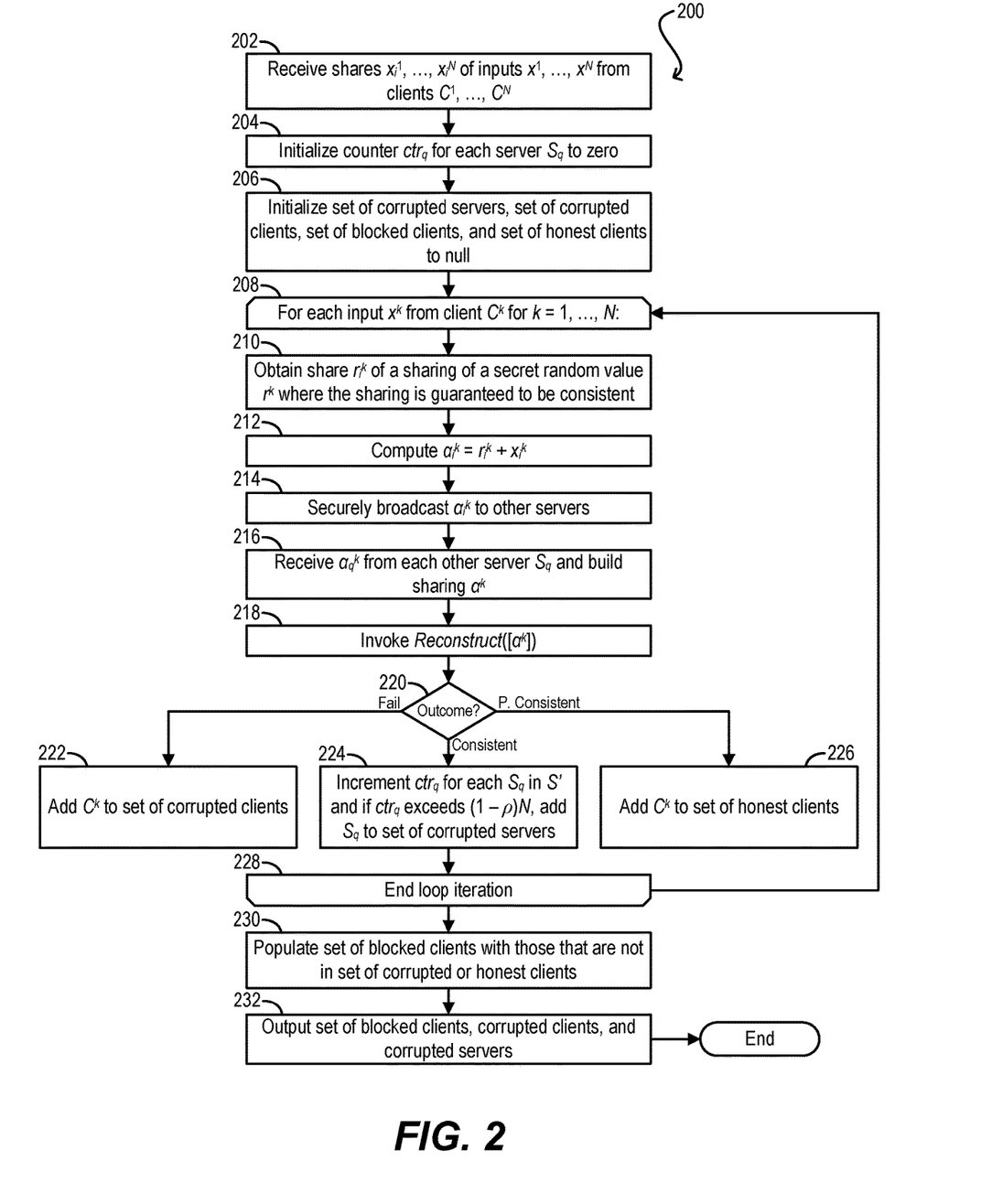
FIG. 2 depicts a flowchart for implementing non-batched robust input verification according to certain embodiments.

FIG. 2 depicts a flowchart 200 that may be executed by each server $S_i$ of FIG. 1 (where i=1, . . . , n) for implementing a non-batched (i.e., per-client) version of the novel input verification protocol of the present disclosure according to certain embodiments. Flowchart 200 assumes that the inputs submitted by clients $C^1, \ldots, C^N$ are shared via Shamir's secret sharing; however, one of ordinary skill in the art will appreciate that the high-level concepts embodied by this protocol may also be applied to scenarios in which other threshold secret sharing schemes are used.

Starting with blocks 202 and 204, server $S_i$ can receive shares $x_i^1, \ldots, x_i^N$ of inputs $x^1, \ldots, x^N$ from clients $C^1, \ldots, C^N$ and can initialize a counter $ctr_q$ for every server $S_q$ (where q∈[n]) to zero.

At block 206, server $S_i$ can initialize a set of corrupted servers $\tilde{S}$, a set of corrupted clients $\tilde{C}$, a set of blocked clients $\hat{C}$, and a set of honest clients H to null (Ø). It is important to note that during execution of the protocol all honest servers agree on these three sets (so for example, there is no situation of a conflict in which honest server $S_i$ decides that server $S_c$ is corrupted while honest server $S_j$ decides that server $S_{c'}$ (c≠c') is corrupted). Server $S_i$ can then enter a loop for each input $x^k$ provided by a given client $C^k$ for k=1, . . . , N (block 208).

Within the loop, server $S_i$ can obtain a share $r_i^k$ of a sharing of a secret random value $r^k$ where the sharing is guaranteed to be consistent (block 210). As mentioned previously, in certain embodiments shares $r_1, \ldots, r_n$ can be computed offline and seeded on respective servers $S_1, \ldots, S_n$ using a secure method.

Upon obtaining $r_i^k$, server $S_i$ can compute $\alpha_i^k = r_i^k + x_i^k$ (block 212), securely broadcast $\alpha_i^k$ to the other servers (block 214), and receive share $\alpha_q^k$ from every other server $S_q$, thereby allowing it to build a sharing a (block 216).

At blocks 218 and 220, server $S_i$ can invoke Reconstruct ([$\alpha^k$]), which attempts to find/interpolate a t-polynomial f in which $f(q) = \alpha_q^k$ for at least 3t+1 shares of $\vec{\alpha^k}$, and check the outcome. If the Reconstruct procedure fails (i.e., no polynomial is found), server $S_i$ can conclude that client $C^k$ is corrupted and can add client $C^k$ to the set of corrupted clients $\tilde{C}$ (block 222).

If the Reconstruct procedure succeeds but there is a set of servers S'⊂S whose shares disagree with reconstructed polynomial f (i.e., the sharing is consistent), server $S_i$ can increment counter $ctr_q$ for each server $S_q$∈S' (block 224). As part of this step, if there is a server $S_q$ whose counter $ctr_q$ has exceeded (1−ρ)N, server $S_i$ can add server $S_q$ to the list of corrupted servers $\tilde{S}$.

And if the Reconstruct procedure succeeds and there are no bad points (i.e., the sharing is perfectly consistent), server $S_i$ can add client $C^k$ to the set of honest clients H (block 226). Server $S_i$ can then reach the end of the current loop iteration (block 228) and return to block 208 to process the next input $x^k$.

Upon processing all client inputs, server $S_i$ can populate the set of blocked clients e with those clients that are not in $\tilde{C}$ or H (block 230). Finally, at block 232, server $S_i$ can output the set of blocked clients $\hat{C}$, the set of corrupted clients C, and the set of corrupted servers S and flowchart 200 can end. Generally speaking, the inputs of corrupted clients (i.e., clients in $\tilde{C}$) will be disregarded by the servers during computation phase 110 and the corrupted servers (i.e., servers in $\tilde{S}$) will be blocked from participating in phase 110.

Further, although not specifically shown in FIG. 2, the blocked clients in $\hat{C}$ can be given another opportunity to provide their respective shares via an alternative, stronger input scheme in which client-side cheating is disabled by design. This stronger input scheme will typically require more communication and/or compute resources than the input scheme described above but should not significantly impact the overall performance of input verification phase 108 if (1−ρ) is kept relatively small.

4. Batched Robust Input Verification

Figure 3A:
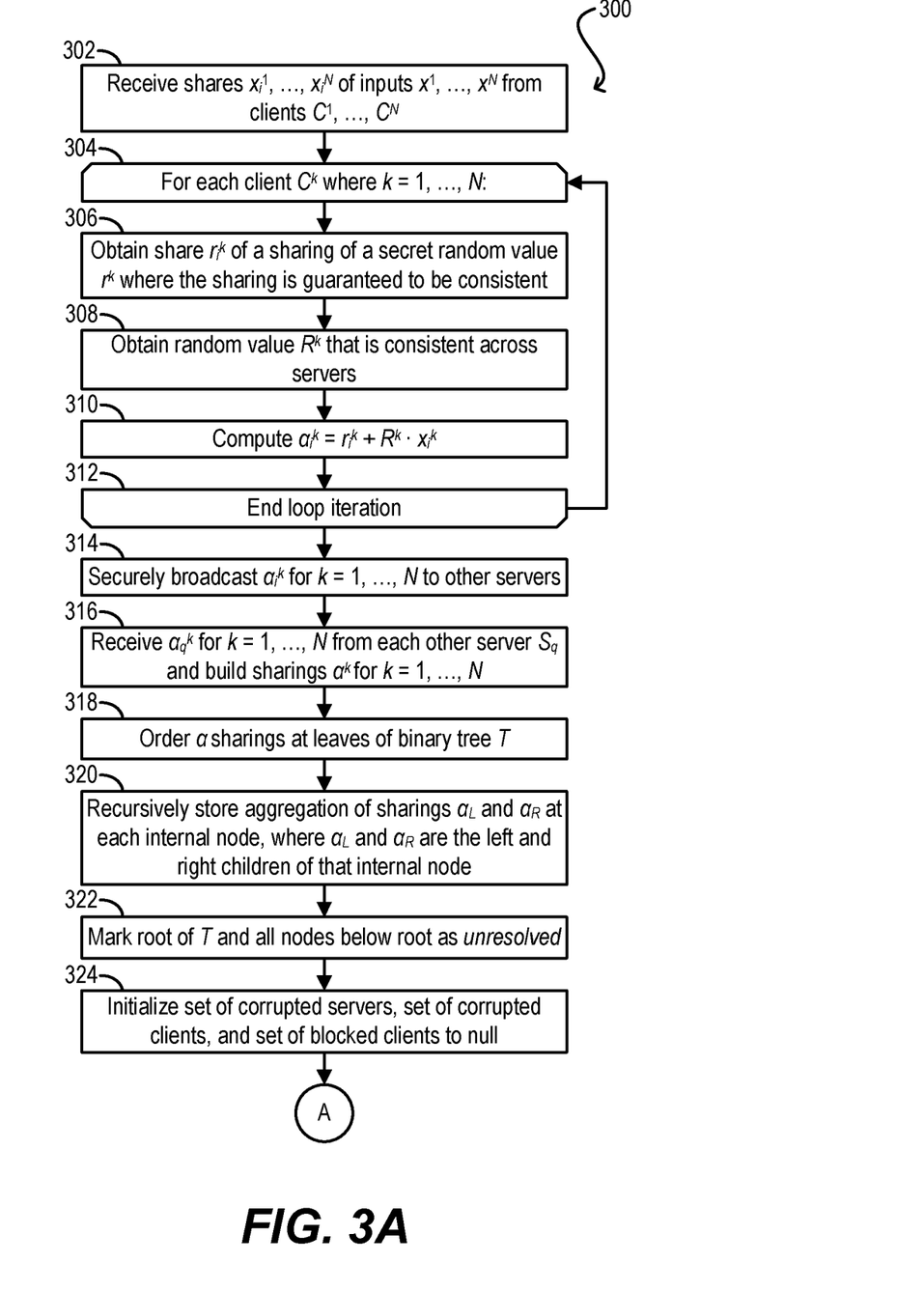
FIGS. 3A and 3B depict a flowchart for implementing batched robust input verification according to certain embodiments.
Figure 3B:
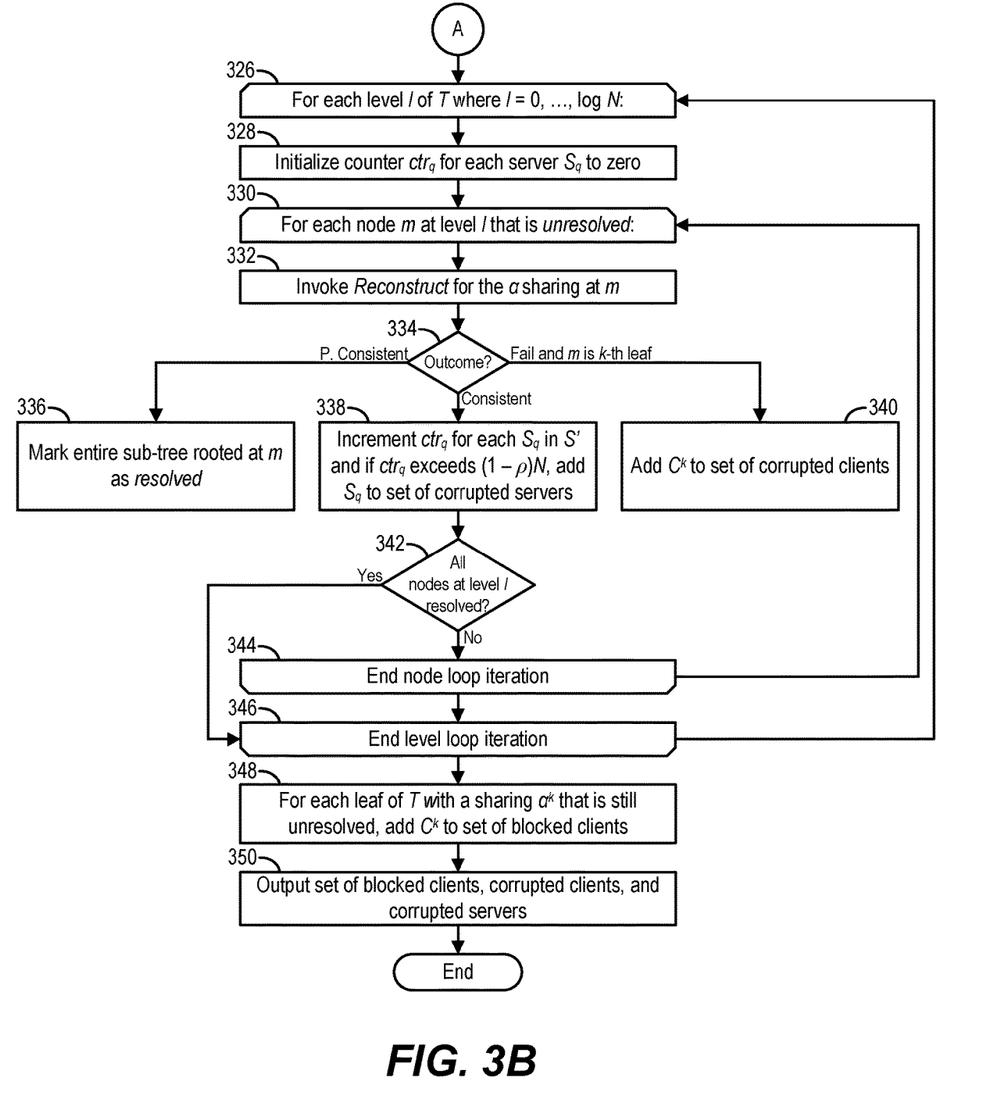

FIGS. 3A and 3B depict a flowchart 300 that may be executed by each server $S_i$ of FIG. 1 (where i=1, . . . , n) for implementing a batched version of the novel input verification protocol of the present disclosure according to certain embodiments. As noted above, instead of verifying the sharing of each client individually, this batched approach attempts to verify the input sharings of all clients $C^1, \ldots, C^N$ together (i.e., as an aggregation), utilizing the fact that the addition of perfectly consistent sharings results in a perfectly consistent sharing.

This batched approach results in at least two efficiencies: first, if all clients and servers are honest (which will often be the case in many applications), only a single verification round is needed. This is in contrast to the non-batched approach presented in FIG. 2 where every client input must be verified, regardless of whether all clients/servers are honest or not. Second, the batched approach requires that the servers communicate with each other only once during input verification phase 108 (in order to communicate all of their shares for all client inputs). With the non-batched approach of FIG. 2, the servers need to communicate with each other for every client input in order to verify that particular input.

It should be noted that the batched approach assumes that (1−ρ) is relatively low (i.e., there are relatively few corrupted clients). In cases where (1−ρ) approaches 1, it may be preferable from a performance perspective to perform per-client verification per flowchart 200 of FIG. 2. It is possible to bound the value of (1−ρ)N using various methods such as, e.g., a proof-of-work based solution that prevents a single adversarial entity from efficiently coordinating many malicious clients, a required per-client payment, and so on. Bounding $(1-\rho)N$ remains out of the scope of this disclosure.

Turning now to FIG. 3A, starting with blocks 302 and 304, server $S_i$ can receive shares $x_i^1, \ldots, x_i^N$ of inputs $x^1, \ldots, x^N$ from clients $C^1, \ldots, C^N$ and enter a loop for each client $C^k$ (where $k=1, \ldots, N$). Within this loop, server $S_i$ can obtain a share $r_i^k$ of a sharing of a secret random value $r^k$ where the sharing is guaranteed to be consistent (block 306), obtain a public random value $R^k$ (that is consistent across all servers) (block 308), and compute $\alpha_i^k = r_i^k + R^k \cdot x_i^k$ (block 310). The purpose of $R^k$ is to randomly modify the share provided by client $C^k$ and thereby prevent two or more corrupted clients from colluding in a manner where they each individually submit invalid shares, but the invalid shares become valid when added together (which would break this protocol).

Upon completing the loop (block 312), server $S_i$ can securely broadcast $\alpha_i^k$ for $k=1, \ldots, N$ to the other servers (block 314) and receive $\alpha_q^k$ for $k=1, \ldots, N$ from each other server $S_q$ (block 316), thereby allowing server $S_i$ to build sharings $\vec{\alpha}^k$ for $k=1, \ldots, N$.

At blocks 318 and 320, server $S_i$ can initialize a binary tree T by ordering the $\alpha$ sharings at the leaves of T (such that $\vec{\alpha}^k$ resides at the k-th leaf) and recursively storing $\vec{\alpha}_L + \vec{\alpha}_R$ at an internal node where $\vec{\alpha}_L$ and $\vec{\alpha}_R$ are the left and right children of that internal node (resulting in a tree height of log N where the root is at level 0 and the leaves at level log N) (block 320). Server $S_i$ can further mark the root of T and all nodes below the root as unresolved (block 322).

Server $S_i$ can then initialize a set of corrupted servers $\tilde{S}$, a set of corrupted clients $\tilde{C}$, and a set of blocked clients $\hat{C}$ to null ($\emptyset$) (block 324) and flowchart 300 can proceed to FIG. 3B.

At block 326 of FIG. 3B, can enter a loop for each level $l=0, \ldots, \log N$ of binary tree T. Within the level loop, server $S_i$ can initialize a counter $ctr_q$ for every server $S_q$ (where $q \in [n]$) to zero (block 328), enter another loop for each node m at level l that is marked as unresolved (block 330), execute Reconstruct([$\alpha$]) for the $\alpha$ sharing of node m (block 332), and check the outcome (block 334). If Reconstruct procedure succeeds and there are no bad points (i.e., the sharing is perfectly consistent), server $S_i$ can mark the entire sub-tree rooted at node m as resolved (block 336).

If the Reconstruct procedure succeeds but there is a set of servers $S' \subset S$ whose shares disagree with the reconstructed polynomial, server $S_i$ can increment counter $ctr_q$ for each server $S_q \in S'$ (block 338). As part of this step, if there is a server $S_q$ whose counter $ctr_q$ has exceeded $(1-\rho)N$, server $S_i$ can add server $S_q$ to the list of corrupted servers S (which means that from this point, $S_q$ can be safely ignored by all honest servers).

And if the Reconstruct procedure fails (i.e., no polynomial is found) and node m is the k-th leaf of T, server $S_i$ can conclude that client $C^k$ is corrupted and can add client $C^k$ to the set of corrupted clients $\tilde{C}$ (block 340). In this case, because $C^k$ is considered "corrupted" rather than "blocked," it is not entitled to the opportunity of using the stronger input scheme mentioned above.

Subsequently to blocks 336-340, server $S_i$ can check whether all nodes at level l are now marked as resolved (block 342); if so, server $S_i$ can exit the node loop. Otherwise, server $S_i$ can reach the end of the current node loop iteration (block 344) and return to block 330 in order to process the next node m at level l. Further, upon completing the node loop, server $S_i$ can reach the end of the current level loop iteration (block 346) and return to block 326 in order to process the next level l of binary tree T.

Upon completing the level loop, server $S_i$ can, for each leaf of T comprising a sharing $\vec{\alpha}^k$ that is still marked as unresolved, add client $C^k$ (i.e., the client that provided the input $x^k$ used to generate $\vec{\alpha}^k$) to the set of blocked clients $\hat{C}$ (block 348). Finally, at block 350, server $S_i$ can output the set of blocked clients $\vec{C}$, the set of corrupted clients $\tilde{C}$, and the set of corrupted servers $\tilde{S}$ and flowchart 300 can end. As with flowchart 200 of FIG. 2, the blocked clients in $\hat{C}$ can be given another opportunity to provide their respective shares via a stronger input scheme in which client-side cheating cannot be performed.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
receiving, by each server in a plurality of servers executing a secure multi-party computation (MPC) protocol, shares of a plurality of inputs to the MPC protocol from a plurality of clients, wherein the plurality of servers are distinct from the plurality of clients, wherein each input in the plurality of inputs is private to each client in the plurality of clients, and wherein each share is generated from its corresponding input using a threshold secret sharing scheme;
verifying, by said each server, whether the shares of the plurality of inputs are valid or invalid, wherein a share is invalid if the share does not conform to rules of the threshold secret sharing scheme;
for each invalid share, determining, by said each server, whether a client that submitted the invalid share is a corrupted client, which means that the client purposefully submitted the invalid share to the plurality of servers, or a server that holds the invalid share is a corrupted server, which means that the server received a valid share from the client and changed the valid share into the invalid share;
upon determining that the client that submitted the invalid share is a corrupted client, ignoring, by said each server, the input of the client during a computation phase of the MPC protocol; and
upon determining that the server that holds the invalid share is a corrupted server, preventing, by said each server, the server that holds the invalid share from participating in the computation phase.

2. The method of claim 1 wherein there are n servers in the plurality of servers and at most $t<n/4$ servers are corrupted, and
wherein there are N clients in the plurality of clients and at most $(1-\rho)N$ clients are corrupted for $0<\rho\leq 1$.

3. The method of claim 2 wherein the verifying and the determining comprises:
initializing a counter for each server in the plurality of servers to zero; and
upon determining that a server in the plurality of servers holds an invalid share of a consistent input sharing:
incrementing the server's counter by one, and
if the server's counter exceeds $(1-\rho)N$, adding the server to a set of corrupted servers.

4. The method of claim 1 wherein the verifying and the determining comprises:
determining that an input sharing submitted by a client in the plurality of clients is not consistent; and
adding the client to a set of corrupted clients.

5. The method of claim 1 wherein the determining comprises:
determining a set of blocked clients in the plurality of clients that may or may not be corrupted; and
requesting that the set of blocked clients resubmit the shares of their inputs using an alternative input scheme that is distinct from the threshold secret sharing scheme.

6. The method of claim 1 wherein the shares are verified on a per-client basis.

7. The method of claim 1 wherein the shares are verified together for all clients in the plurality of clients.

8. A non-transitory computer readable storage medium having stored thereon program code executable by each server in a plurality of servers executing a secure multi-party computation (MPC) protocol, the program code causing said each server to execute a method comprising:
receiving shares of a plurality of inputs to the MPC protocol from a plurality of clients, wherein the plurality of servers are distinct from the plurality of clients, wherein each input in the plurality of inputs is private to each client in the plurality of clients, and wherein each share is generated from its corresponding input using a threshold secret sharing scheme;
verifying whether the shares of the plurality of inputs are valid or invalid, wherein a share is invalid if the share does not conform to rules of the threshold secret sharing scheme;
for each invalid share, determining whether a client that submitted the invalid share is a corrupted client, which means that the client purposefully submitted the invalid share to the plurality of servers, or a server that holds the invalid share is a corrupted server, which means that the server received a valid share from the client and changed the valid share into the invalid share;
upon determining that the client that submitted the invalid share is a corrupted client, ignoring the input of the client during a computation phase of the MPC protocol; and
upon determining that the server that holds the invalid share is a corrupted server, preventing the server that holds the invalid share from participating in the computation phase.

9. The non-transitory computer readable storage medium of claim 8 wherein there are n servers in the plurality of servers and at most $t<n/4$ servers are corrupted, and
wherein there are N clients in the plurality of clients and at most $(1-\rho)N$ clients are corrupted for $0<\rho\leq 1$.

10. The non-transitory computer readable storage medium of claim 9 wherein the verifying and the determining comprises:
initializing a counter for each server in the plurality of servers to zero; and
upon determining that a server in the plurality of servers holds an invalid share of a consistent input sharing:
incrementing the server's counter by one, and
if the server's counter exceeds $(1-\rho)N$, adding the server to a set of corrupted servers.

11. The non-transitory computer readable storage medium of claim 8 wherein the verifying and the determining comprises:
    determining that an input sharing submitted by a client in the plurality of clients is not consistent; and
    adding the client to a set of corrupted clients.

12. The non-transitory computer readable storage medium of claim 8 wherein the determining comprises:
    determining a set of blocked clients in the plurality of clients that may or may not be corrupted; and
    requesting that the set of blocked clients resubmit the shares of their inputs using an alternative input scheme that is distinct from the threshold secret sharing scheme.

13. The non-transitory computer readable storage medium of claim 8 wherein the shares are verified on a per-client basis.

14. The non-transitory computer readable storage medium of claim 8 wherein the shares are verified together for all clients in the plurality of clients.

15. A server among a plurality of servers executing a secure multi-party computation (MPC) protocol, the server comprising:
    a processor; and
    a non-transitory computer readable medium having stored thereon program code that, when executed, causes the processor to:
        receive shares of a plurality of inputs to the MPC protocol from a plurality of clients, wherein the plurality of servers are distinct from the plurality of clients, wherein each input in the plurality of inputs is private to each client in the plurality of clients, and wherein each share is generated from its corresponding input using a threshold secret sharing scheme;
        verify whether the shares of the plurality of inputs are valid or invalid, wherein a share is invalid if the share does not conform to rules of the threshold secret sharing scheme;
        for each invalid share, determine whether a client that submitted the invalid share is a corrupted client, which means that the client purposefully submitted the invalid share to the plurality of servers, or a server that holds the invalid share is a corrupted server, which means that the server received a valid share from the client and changed the valid share into the invalid share;
        upon determining that the client that submitted the invalid share is a corrupted client, ignore the input of the client during a computation phase of the MPC protocol; and
        upon determining that the server that holds the invalid share is a corrupted server, prevent the server that holds the invalid share from participating in the computation phase.

16. The server of claim 15 wherein there are n servers in the plurality of servers and at most $t<n/4$ servers are corrupted, and
    wherein there are N clients in the plurality of clients and at most $(1-\rho)N$ clients are corrupted for $0<\rho\leq 1$.

17. The server of claim 16 wherein the program code that causes the processor to perform the verifying and the determining comprises program code that causes the processor to:
    initialize a counter for each server in the plurality of servers to zero; and
    upon determining that a server in the plurality of servers holds an invalid share of a consistent input sharing:
        increment the server's counter by one, and
        if the server's counter exceeds $(1-\rho)N$, add the server to a set of corrupted servers.

18. The server of claim 15 wherein the program code that causes the processor to perform the verifying and the determining comprises program code that causes the processor to:
    determine that an input sharing submitted by a client in the plurality of clients is not consistent; and
    add the client to a set of corrupted clients.

19. The server of claim 15 wherein the program code that causes the processor to perform the determining comprises program code that causes the processor to:
    determine a set of blocked clients in the plurality of clients that may or may not be corrupted; and
    request that the set of blocked clients resubmit the shares of their inputs using an alternative input scheme that is distinct from the threshold secret sharing scheme.

20. The server of claim 15 wherein the shares are verified on a per-client basis.

21. The server of claim 15 wherein the shares are verified together for all clients in the plurality of clients.

* * * * *